United States Patent [19]

Phillips et al.

[11] Patent Number: 5,053,862

[45] Date of Patent: Oct. 1, 1991

[54] APPARATUS AND METHOD FOR GENERATING A HORIZONTAL RESET SIGNAL SYNCHRONOUS WITH A SUBCARRIER LOCKED CLOCK

[75] Inventors: Larry G. Phillips; Edwin R. Meyer; David C. Greene, all of Knoxville, Tenn.

[73] Assignee: North American Philips Corporation, New York, N.Y.

[21] Appl. No.: 339,032

[22] Filed: Apr. 14, 1989

[51] Int. Cl.⁵ .................................... H04N 5/04
[52] U.S. Cl. ........................... 358/17; 358/158
[58] Field of Search ............... 358/10, 17, 19, 22, 358/148, 149, 150, 158, 183

[56] References Cited

U.S. PATENT DOCUMENTS

| | | | |
|---|---|---|---|
| 4,335,403 | 6/1982 | Srivastava | 358/148 |
| 4,446,482 | 5/1984 | Srivastava et al. | 358/150 |
| 4,454,531 | 6/1984 | Elmis et al. | 358/17 |
| 4,468,687 | 8/1984 | Munezawa et al. | 358/19 |
| 4,504,862 | 3/1985 | Achtstaetter | 358/17 |
| 4,562,457 | 12/1985 | Salvia | 358/19 |
| 4,697,207 | 9/1987 | Lilley | 358/19 |

FOREIGN PATENT DOCUMENTS 190911 8/1986 European Pat. Off.
2951781 7/1980 Fed. Rep. of Germany.

*Primary Examiner*—James J. Groody
*Assistant Examiner*—David E. Harvey
*Attorney, Agent, or Firm*—Edward W. Goodman

[57] ABSTRACT

A method and apparatus for synchronizing a received television signal to a subcarrier locked signal is provided. The apparatus includes a comparison block for determining whether the received television signal and subcarrier locked signal are related by a predetermined fixed frequency relationship and for providing indications of the same, and a signal generation block for dividing down the subcarrier locked signal according to the predetermined fixed frequency relationship so as to provide an output signal which is synchronized with the subcarrier locked signal, and at a frequency determined according to the fixed frequency relationship when the signals are related. The apparatus is particularly useful in PIP applications where the received television signal is a horizontal signal and the subcarrier locked signal is a four times multiple of the subcarrier frequency. The comparison block preferably includes a counter and a windowing circuit for determining whether edges of horizontal signal pulses are received within or outside a predetermined time window, and a decision circuit for determining whether the occurrences (counts) of in and out of window edges are indicative of related or unrelated signals. The entire apparatus preferably includes only flip-flops, simple logic gates such as AND, NAND, or OR gates, inverters, multiplexer switches, and resettable counters. The apparatus also preferably further includes a standard combination of flip-flops and a NAND gate for providing a synchronized horizontal reset output signal when the comparison block determines that the received horizontal clock and the subcarrier locked clock are not related.

14 Claims, 2 Drawing Sheets

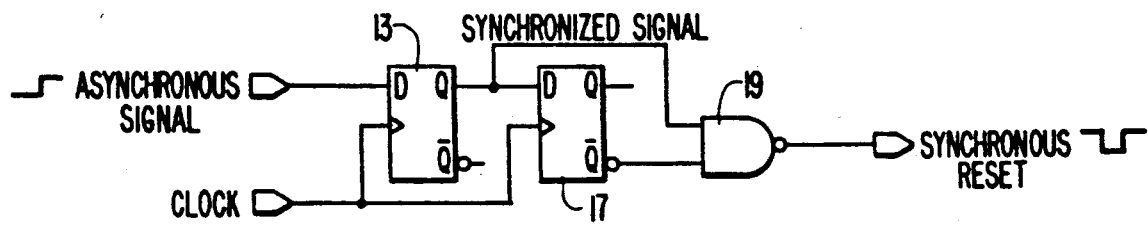
FIG.1
PRIOR ART
FIG.2a
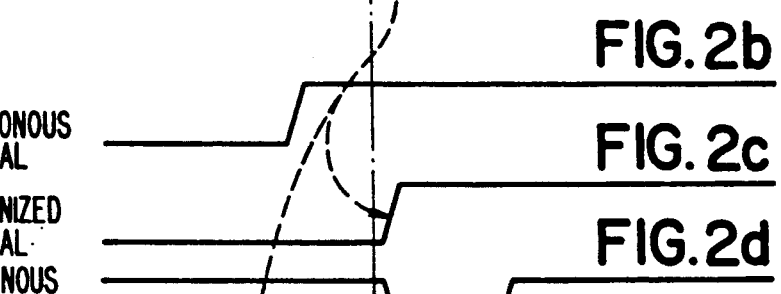

APPARATUS AND METHOD FOR GENERATING A HORIZONTAL RESET SIGNAL SYNCHRONOUS WITH A SUBCARRIER LOCKED CLOCK

BACKGROUND OF THE INVENTION

This invention generally relates to apparatus and methods for synchronizing a first television signal to a second television signal. More particularly, the invention relates to apparatus and methods for generating a horizontal reset clock signal which is synchronized to a subcarrier locked clock. The invention is particularly useful for picture-in-picture video applications, although the scope of the invention is not limited thereto.

The increasing use of digital technology in television signal processing has resulted in particular requirements for the clock signals used by the digital circuitry. In particular, where stored images are to be inserted onto a screen (such as in picture-in-picture arrangements), a line-locked clock for controlling the insertion is desirable so that the inserted images will appear stationary. When using color information encoders and decoders, a subcarrier-locked clock is desirable so that the required digital circuitry can be simplified. In systems utilizing color information encoders and decoders as well as stored images, it is desirable to have a clock which is both line-locked and subcarrier locked, and in such situations, the PIP picture position in the generated image will be perfectly stationary.

In a standard RS170A television signal, the horizontal scanning frequency has a fixed predetermined relationship with respect to the subcarrier signal: $F_h = (2/455)F_{sc}$; where $F_h$ is the horizontal frequency and $F_{sc}$ is the subcarrier frequency. In non-RS170A television signals, (e.g. from VCR's or test signal patterns), the $F_h$ and $F_{sc}$ signals are not derived from the same source, and hence have unrelated frequencies, such that the frequency $F_h$ may be significantly greater than or less than $(2/455)F_{sc}$.

Where color information encoders and decoders are used, and in accord with the RS170A standard, signals at a multiple of the subcarrier such as $4F_{sc} = 14.3$ MHz (910 times the horizontal frequency) which are locked to the subcarrier frequency are used. Since in the RS170A standard the horizontal scanning frequency has a fixed frequency relationship with respect to the subcarrier signal, and because a multiple of the subcarrier signal is locked to the subcarrier signal, in theory it should be possible to synchronize the asynchronous horizontal reset clock to the subcarrier multiple. In reality, such a synchronization is not straight-forward as the horizontal signal frequency may not be exactly 910 $F_{sc}$, but may vary by $+/-1$ clock period of 4FSC, or more, due to noise induced phase jitter.

The standard circuitry for generating a synchronous horizontal reset signal from an asynchronous horizontal line signal is seen in FIG. 1. The provided circuit includes two D flip-flops 13 and 17, and a NAND gate 19. The D input to flip-flop 13 is the asynchronous horizontal signal, while a four times subcarrier frequency (FSC4) clock (FIG. 2a) is used as the clock input to both flip-flops 13 and 17. The Q output of flip-flop 13 is coupled to the D input of flip-flop 17, as well as to one input into NAND gate 19. The not Q output of flip-flop 17 is used as a second input into NAND gate 19. As seen in the timing diagrams of FIGS. 2b-2d in an initial state, the D input (FIG. 2b) and Q output (FIG. 2c) of flip-flop 13 are low, thereby providing a zero input to NAND gate 19 which provides an inactive high output (FIG. 2d). When the asynchronous signal goes high, at the next 4FSC clock, the high D input at flip-flop 13 is clocked over to the Q output of flip-flop 13. As a result, both inputs to NAND gate 19 are high, and NAND gate 19 provides a low output pulse. At the next FSC4 clock signal, the high D input at flip-flop 17 is clocked over to the Q output. Hence, the not Q output of flip-flop 17 goes low, and the NAND gate output returns to its high state. The cycle repeats only when the asynchronous signal goes high.

Difficulties with the standard circuitry arise where a pulse of the FSC4 clock occurs just after the rising edge of the asynchronous signal. In such circumstances denoted as the "indeterminate case" in FIGS. 2e–2g and as indicated by the dotted lines, it is possible that the change at the D input of flip-flop 13 will not have yet registered, and hence, the new status cannot be clocked across to the Q output until the next FSC4 clock signal. Such a situation could cause the output synchronous horizontal reset pulse to jitter (as indicated in FIG. 2g) relative to the main signal, resulting in a jittery picture-in-picture. While such a situation cannot be avoided where the horizontal clock is not related to the subcarrier clock (i.e. in situations where they were not originally derived from the same source), it is possible to avoid such jitter in standard RS-170A video applications where the frequencies of the horizontal line signal and the subcarrier are related. One manner of avoiding such jitter is to use complicated and expensive circuitry such as digital phase locked loops. The invention detailed below, however, provides an inexpensive manner of solving the jitter problem.

SUMMARY OF THE INVENTION

It is therefore the primary object of the invention to provide means for generating a horizontal reset pulse which is synchronized to a subcarrier locked clock.

It is another object of the invention to provide means which detects whether an incoming horizontal video signal has a fixed predetermined frequency relationship to a subcarrier locked clock, and if so, which generates an output horizontal reset pulse which is synchronized to and which is a modulus of the subcarrier locked clock, thereby ensuring that the output pulse conforms to the frequency relationship between the subcarrier locked clock and the horizontal video signal.

It is a further object of the invention to provide means which detects whether an incoming horizontal video signal has a fixed predetermined relationship to a subcarrier locked clock, and if not, which generates a horizontal pulse according to techniques known in the art.

In accord with the objects of the invention, an apparatus for regenerating a television signal which is synchronous with a subcarrier locked signal is provided and comprises: comparison means for determining whether a received television signal which is to be regenerated and a subcarrier locked signal have a predetermined fixed frequency relationship, and for generating a first indication when they are related and a second indication when they are not related; and signal generation means for dividing down the subcarrier locked signal according to the fixed predetermined relationship to create, when said first indication is generated by said comparison means, a regenerated output signal which is synchronized with the subcarrier locked signal, and at a frequency predetermined by the fixed frequency relationship. In the preferred embodiment, the received television signal is a horizontal (e.g. horizontal line) signal with frequency $F_h$, the subcarrier locked signal is a multiple of the subcarrier with frequency $4F_{sc}$, and the output signal is a horizontal reset signal used as a horizontal reset for the main television signal and used to control insertion of PIP information. The comparison means preferably includes windowing means for determining whether the received horizontal signal pulses within a predetermined time window around the time when it should pulse if it is related to the subcarrier signal, and decision means for determining whether the occurrences (count) of out of window pulses is indicative of related or unrelated clocks. The comparison means and the signal generation means are preferably comprised of flip-flops, simple logic circuitry such as AND, NAND, and OR gates and inverters and multiplexer switches, and resettable counters. The synchronization means also preferably further comprises a standard combination of flip-flops and a NAND gate for providing a synchronized horizontal signal when the comparison means determines that the received horizontal clock and the subcarrier are not related.

A better understanding of the invention, as well as additional advantages and objects of the invention will become apparent to those skilled in the art upon reference to the detailed description and the accompanying drawings.

BRIEF DESCRIPTION OF THE DRAWINGS

FIG. 1 is a block diagram of a prior art circuit for synchronizing a horizontal signal to a signal line-locked to the subcarrier signal;

FIGS. 2a–2g timing diagrams of the FIG. 1 circuitry, showing the normal operation and indeterminant case of incoming clock signals.

DETAILED DESCRIPTION OF THE PREFERRED EMBODIMENT

Figure 3:
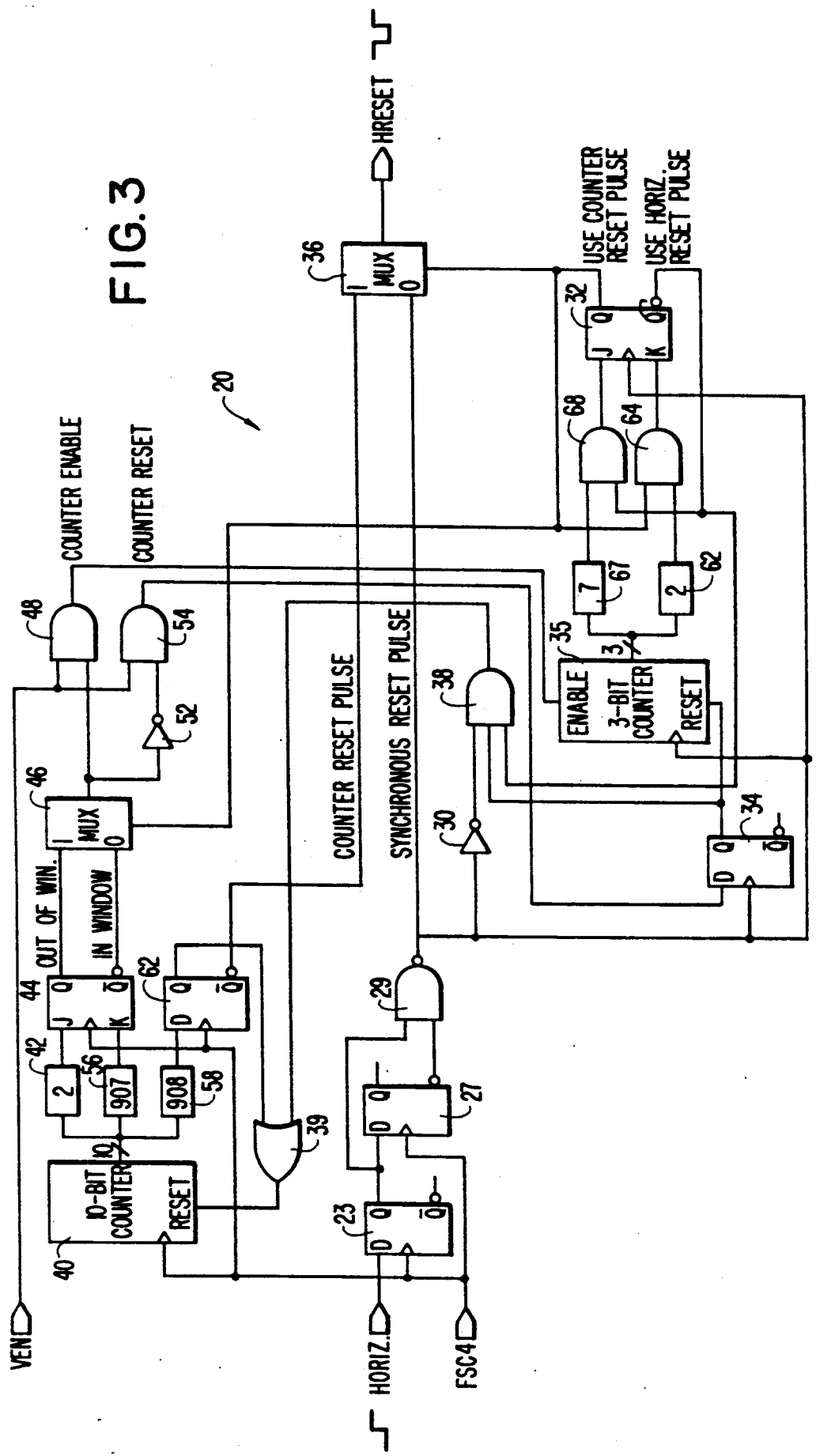
FIG. 3 is a block diagram of the horizontal reset generator of the invention.

A horizontal reset signal regenerator 20 is seen in FIG. 3 having the subcarrier locked four times subcarrier frequency signal FSC4 as a first input and the horizontal signal HORIZ as a second input. The HORIZ signal and the FSC4 signal are relatively asynchronous, although the HORIZ signal may be related to the FSC4 signal in that the frequency of the HORIZ signal may originally have been generated to be at 2/455 the rate of the subcarrier frequency and hence 1/910 the frequency of the FSC4 signal. It is the object of the provided circuitry of the horizontal reset signal regenerator 20 to provide an output signal HRESET which, if the HORIZ and FSC4 signals are related, is synchronous with and at a frequency of (1/910)FSC4, and if the HORIZ and FSC4 signals are not related, is simply synchronous with the FSC4 signal but at a frequency which generally follows the incoming HORIZ signal.

Where the HORIZ and FSC4 signals are not related in frequency according to RS170A, standard circuitry comprising D flip-flops 23, 27, and NAND gate 29 are used to provide a HRESET output pulse signal which is synchronous with the FSC4 subcarrier locked signal. The connections and functioning of the D flip-flops 23, 27, and NAND gate 29 are identical to the connections and functioning of identical circuitry discussed above in relation to FIG. 1, and no further discussion of the same will be presented here. The only matters of import are that the output of NAND gate 29 is provided to inverter 30 and as a clock signal to JK flip-flop 32, and D flip-flop 34, for purposes to be described hereinafter, as well as being one of two signals provided to switch-/multiplexer 36 which passes the output horizontal reset signal of the circuit.

For purposes of description only, a starting configuration is assumed where the HORIZ signal and the FSC4 signal are not related such that the not Q output of flip-flop 32 is set to one. It is also assumed that the vertical enable signal (VEN) is set to one as will be discussed in more detail hereinafter. Further, it is assumed that the Q output of flip-flop 34 is also set to one such that three bit counter 35 is reset. One FSC4 clock cycle after the HORIZ signal goes high, the output of NAND gate 29 goes low. In turn, inverter 30 provides a high input to three-input AND gate 38 which has as its other inputs the Q output of flip-flop 34 and the not Q output of flip-flop 32. Thus, one FSC4 cycle after the HORIZ signal goes high, a high value is sent to OR gate 39 which resets ten bit counter 40.

After the ten bit counter 40 is reset, it starts counting the number of rising (or falling) edges of the FSC4 clock. At a count of two, the two count decode 42 is enabled, and the J input into JK flip-flop 44 goes high. With the K input low, at the next clock FSC4 cycle (third count), the Q output of flip-flop 44 goes high and the not Q output goes low. Because the "window" signal is being selected by mux 46 (the Q output of flip-flop 32 being zero and controlling mux 46), it is the not Q output which is fed from multiplexer 46 to AND gate 48 and inverter 52. Thus, when the not Q output of JK flip-flop 44 goes low, the counter enable for three-bit counter 35 is disabled, while the D input into flip-flop 34 goes high via inverter 52 and AND gate 54. Regardless, at a count of three for the ten bit counter 40, the two count decode 42 again goes low, providing the J input of flip-flop 44 a low value. With both J and K low, the not Q output does not change. Hence, the three bit counter 35 is not enabled.

If prior to the nine hundred seventh count, the horizontal signal should go high again, at a following FSC4 pulse, the output of NAND gate 29 goes low. As a result, all three inputs into AND gate 38 again go high such that the ten bit counter 40 is reset so as to maintain synchronization with the incoming horizontal pulses. Also at the trailing end of the low synchronous reset pulse, flip-flop 34 is toggled such that the high value at its D input is transferred to the Q output and the three-bit counter is again reset. In essence, what has occurred is that the three bit counter which is used (as described hereinafter) to count the number of times the horizontal pulse occurs "in window" is reset to zero. Because it is reset and has not reached a value of seven, the mode of operation of the circuitry is not changed.

If the horizontal input signal does not occur before the nine hundred eighth pulse, at the nine hundred seventh pulse, the nine hundred seven count decode 56 sets the K input to flip-flop 44 to one. As a result, at the nine hundred eighth pulse the Q ouput of flip-flop 44 goes to zero, and the not Q goes to one. In the horizontal reset pulse mode (the not Q of JK flip-flop 32 is set to one, mux 46 outputs a high valve to AND gate 48 and inverter 52. As a result, the three bit counter is enabled, and a zero value is sent via inverter 52 and AND gate 54 to the D input of flip-flop 34. As will be described directly hereafter, if the horizontal pulse arrives within a five pulse window (two before to two after the nine hundred tenth pulse), the three bit counter 35 is caused to count.

At the nine hundred eighth pulse, the nine hundred seven count decode 56 returns to a zero output. However, the JK flip-flop 44 maintains its output values. Thus, the three-bit counter 35 is still enabled. Also, the nine hundred eight count decode 58 goes high and provides a high input to D flip-flop 62. At the next FSC4 clock pulse (nine hundred ninth), the high input at flip-flop 62 is clocked over to the Q output such that a reset pulse for the ten-bit counter 40 occurs via OR gate 39. At the nine hundred tenth FSC4 pulse, the reset of counter 40 keeps the count at zero, as the D flip-flop 62 does not change state quickly enough to change its output before the ten-bit counter receives the same pulse. Thus, only at the nine hundred eleventh pulse does ten bit counter 40 start counting again.

At the nine hundred twelfth pulse, or the second pulse of the new count, the two count decode 42 goes high again. As a result, at the nine hundred thirteenth pulse, the not Q output of flip-flop 44 changes state such that three bit counter 35 is disabled. Thus, from the nine hundred eighth pulse through the nine hundred twelfth pulse inclusive, the three-bit counter 35 is enabled, such that if the NAND gate 29 changes state from low to high (i.e. a HORIZ input pulse is received two FSC4 clocks earlier), that change is counted at the three-bit counter 35. Also, where the horizontal pulse occurs in the window such that a count is registered, when the counter reset output of AND gate 54 goes high as a result of JK flip-flop changing state after the third pulse, the high value at the D input of flip-flop 34 is not transferred over to the Q output because the clock input into flip-flop 34 is not toggled. Hence, regardless of when the horizontal input pulse occurred within the provided five count window, the three bit counter 35 is incremented and is not reset. Also, regardless of when the horizontal input pulse occurred within the provided window, the ten bit counter is reset and starts its new count at the nine hundred eleventh FSC4 pulse. On the other hand, and as previously described, when the horizontal input pulse occurs outside the window, the three bit counter 35 is reset, as is the ten-bit counter, regardless of their count.

During operation, if the HORIZ pulses twice in succession occur inside the provided time window, the count of three-bit counter 35 will reach two. The two count decode 62 will then provide a high input to AND gate 64. However, because the other input into AND gate 64 is set to zero due to the operation in the horizontal reset mode (i.e. the Q output of JK flip-flop 32 is low), the K input to flip-flop 32 stays low. However, if the HORIZ pulses occur within the window seven times in succession, the seven count decode 67 provides a high input to AND gate 68. With the other input into AND gate 68 being high (coming from the not Q output of flip-flop 32), the J input into the JK flip-flop 32 goes high. Then, upon the change of state of NAND gate 29, the output of the JK flip-flop 32 changes, resulting in a change of mode of operation for the circuitry, as it may now be assumed that the input HORIZ signal and the subcarrier locked FSC4 signal are related. When the Q output of flip-flop 32 goes high, instead of the synchronous reset pulse generated by flip-flops 23, 27 and NAND gate 29 being utilized as the HRESET output, the counter reset pulse generated by ten-bit counter 40, nine hundred eight decode 38, and D flip-flop 62 is used.

Thus, mux 36 switches and passes information received at its "1" gate. Likewise, mux 46, which previously was passing "in window" information, switches and passes "out of window" information.

In the counter reset pulse mode where the HRESET output is generated by ten-bit counter 40, nine hundred and eight decode 58 and flip-flop 62, at the third pulse after the ten bit counter 40 is reset, a high value is passed to the Q output of flip-flop 44. As a result, multiplexer switch 46 passes a high value to AND gate 48 which enables the three-bit counter 35. At the same time, inverter 52 passes a low value to AND gate 54, such that a zero appears at the D input to flip-flop 34. If, between the third pulse and the nine hundred eighth pulse, the HORIZ input pulses such that NAND gate 29 goes low, the three bit counter 35 is toggled, as it is enabled. However, if NAND gate does not pulse low during that "out of window" time span, at the nine hundred eighth counted FSC4 pulse of the cycle, the high K input into flip-flop 44 causes the Q output of flip-flop 44 low. As a result, the AND gate 48 disables the three-bit counter 35. Also, the D input to flip-flop 34 goes high (via inverter 52 and AND gate 54) such that if a horizontal pulse occurs, and NAND gate 29 toggles, the high value is transferred to the Q output of flip-flop 34 and the three bit counter 35 is reset. However, because the not Q output of JK flip-flop 32 is low, the three input AND gate 38 is kept low, and the ten bit counter is not, as a result reset. Rather, the ten bit counter 40 is only reset upon the nine hundred eight count decode 58 going high such that at the nine hundred ninth FSC4 pulse, the Q output of flip-flop 62 goes high and toggles the reset input to ten-bit counter 40 via OR gate 39. When the Q output of flip-flop 62 toggles, so does the not Q output. Thus, on the nine hundred ninth count of the ten-bit counter, a low pulse is generated as the output HRESET signal via mux 36. The generated low pulse is synchronous with the FSC4 subcarrier locked signal, and occurs at a frequency of once every nine hundred ten FSC4 pulses (at the nine hundred ninth count of the ten bit counter 40), which is the proper frequency relationship of the HORIZ and FSC4 signals according to the RS170A standard.

As will readily be appreciated, if NAND gate 29 toggles during two consecutive cycles while the three bit counter 35 is enabled (i.e. "out of window"), the two count decode 62 will provide a high input to AND gate 64. Because the circuitry is in the "use the counter reset pulse" mode, the other input to AND gate 64 from the Q output of flip-flop 32 is also high. As a result, upon the next toggling of NAND gate 29, the high value at the K input of flip-flop 32 forces the Q output low and the not Q output high. As a result, the mode of the circuitry is switched such that the HRESET output is taken from the output of NAND gate 29 (i.e. "use horizontal reset pulse"). In other words, because the input horizontal signal did not continue to fall within the provided window, it is assumed that the input HORIZ signal was not related to (i.e. derived from) the subcarrier signal. Thus, a regular signal which is derived from and synchronous with the FSC4 signal cannot be used as the HRESET output. Rather, a signal taken from the output of NAND gate 29, which is synchronous with the FSC4 clock, but not exactly locked to the HORIZ signal input (due to the "indeterminate" case possibility) is utilized.

As aforementioned, a third input into the horizontal reset gen ator 20 is preferably provided. The third input is a vertical enable signal (VEN) which is gated to one of the inputs of each of the counter enable and reset AND gates 48 and 54. When the VEN signal is high, the circuitry functions as discussed above. However, when the VEN signal is low, the three bit counter is never enabled and never reset. Thus, the only circuitry of interest which changes states is the circuitry which outputs the HRESET signal; the flip-flops 23, 27 and NAND gate 29, and the ten bit counter 40, the nine hundred eight count decode 58 and the flip-flop 62. The VEN signal therefore permits a more strenuous test to be utilized, as the VEN signal is only high once every two hundred sixty two or two hundred sixty three lines. As a result, the ten bit counter must count through two hundred sixty two or three counts of nine hundred and ten before an in window or out of window determination is made, as the case may be.

There has been described and illustrated herein a horizontal reset signal generator providing a regenerated horizontal reset output signal which has a predetermined fixed frequency relationship with, and which is synchronous with a subcarrier locked signal when an input horizonal signal and the subcarrier locked signal are related, and which is only synchronous with the subcarrier locked signal otherwise. It will be appreciated by those skilled in the art, that the method invention for regenerating an output signal which is synchronous with a subcarrier related signal and has a fixed frequency relationship therewith is closely related to the teachings of the apparatus invention, and may be derived therefrom. While particular circuitry has been described for accomplishing the objects of the invention, it is not intended that the invention be limited thereby, as it is intended that the invention be broad in scope and that the specifications be read likewise. Thus, while the invention was described in terms of a standard FS170A video signal where the horizontal line signal is related to the subcarrier by a factor of 455/2, it will be appreciated that the teachings of the invention are intended to apply to any situation where a television signal which is related by frequency to, but is asynchronous with a subcarrier locked clock signal must be synchronized to the subcarrier locked clock in a manner consistent with the frequency relationship of the television signal and the clock. Moreover, while particular circuitry was provided for comparing the frequencies of the incoming clock signals to determine whether they were related in a predetermined manner, other comparison means could be used. For example, rather than providing a windowing means for determining whether a signal pulse occurs within a time window around the time the pulse is expected, and then using a decision means counter to determine the number of consecutive times the signal pulse falls outside (or inside in the other mode) the window, a memory means could be utilized for keeping track of the exact times of the pulses. A processor could then conduct an analysis of the accumulated times and make a decision as to whether a relationship exists between the incoming clock signals.

Further, if the preferred windowing means and counter means are used as the comparison means for determining whether the clocks are related, it will be appreciated that numerous changes could be made to the circuitry. For example, the window could be made smaller or larger, simply by changing the count decoders to desired values. Likewise, the number of successive in or out of window counts required before a change of mode is made could be changed in a similar manner. Also, instead of requiring successive in or out of window occurrences to dictate a change of mode, if desired, an up-down counter could be used. In other words, the criteria used for deciding whether the clock signals are or are not related can be set according to the particular requirements or desires of the user. Finally it will be appreciated that while a counter, a count decode means and a flip-flop were utilized for dividing down the FSC4 subcarrier locked signal to provide the synchronized line-locked HRESET output signal of desired frequency when the HORIZ and FSC4 were related, other divide down means could be utilized as desired. Therefore, it will be apparent to those skilled in the art that other changes and modifications may be made to the invention as described in the specification without departing from the spirit and scope of the invention as so claimed.

What is claimed is:

1. Apparatus for regenerating a received television signal to provide an output signal which is synchronous with a subcarrier locked clock signal, comprising:
    a) comparison means for determining whether the received television signal which is to be regenerated and the subcarrier locked clock signal have a predetermined fixed frequency relationship, and for generating a first indication when they are related and a second indication when they are not related; and
    b) output signal generation means for dividing down the subcarrier locked clock signal according to said fixed frequency relationship and, when said first indication is generated by said comparison means, for providing said output signal which is synchronized with said subcarrier locked clock signal and at a frequency determined by said predetermined fixed frquency relationship; wherein
    said signal generation means comprises a first counting means and a count decode means coupled to said first counting means, said first counting means having said subcarrier locked clock signal as a clock input for counting the cycles of said subcarrier locked clock signal, and said count decode means providing a change in its output signal when said first counting means reaches a predetermined count defined by said predetermined fixed frequency relationship, and wherein:
    said signal generation means further comprises a flip-flop means having a first input coupled to said count decode means output, a clock input coupled to said subcarrier locked clock signal, a first output comprising said synchronous output signal with a frequency determined by said predetermined fixed frequency relationship, and a second output coupled to a reset input of said first counting means, wherein one subcarrier locked clock signal after said count decode means provides a change at its output, said first output provides said synchronous output signal pulse and said second output causes said first counting means to reset.

2. Apparatus according to claim 1, wherein:
    said received television signal is a television horizontal line signal, said subcarrier locked clock signal is a clock signal at four times the frequency of a subcarrier, said television horizontal line signal has a frequency equal to approximately 1/910 the frequency of said subcarrier locked clock signal, and said count decode means change its output at a counter count of nine hundred and eight.

3. Apparatus for regeneratig a received television to provide an output signal which is syncronous with a subcarrier locked clock signal, comprising:
   a) comparsion means for determining whether the received television signal which is to be regenerated and the subcarrier locked clock signal have a predetermined fixed frequency relationship, and for generating a first indication when they are related and a second indication when they are not related; and
   b) output signal generation means for dividing down the subcarrier locked clock signal according to said fixed frequency relationship and, when said first indication is generated by said comparison means, for providing said output signal which is synchronized with said subcarrier locked clock signal and at a frquency determined by said predetermined fixed frequency relationship, wherein:
   said comparison means comprises a windowing means for determining whether an edge of said received television signal to be regenerated occurs outside a preset time window around a time when said edge of said received television signal would occur if said received television signal were related to said subcarrier locked clock signal, and a decision means for deciding whether occurrences of received television clock signal edges outside said preset time window are indicative of said received television signal and said subcarrier locked clock signal being unrelated, wherein:
   said decision means is further for deciding whether occurrences of said received television signal edges inside said preset time window are indicative of said received television signal and said subcarrier locked clock signal being related, and wherein:
   said signal generation means comprises a first counting means and a count decode means coupled to said first counting means, said first counting means having said subcarrier locked clock signal as a clock input for counting the cycles of said subcarrier locked clock signal, and said count decode means providing a change in its output signal when said first counting means reaches a perdetermined count defined by said predetermined fixed frquency relationship, and output signal of said count decode means being coupled to a reset input of said first counting means for resetting said counting means at a count defined by said predetermined fixed frequency relationship, and
   said windowing means comprises a said first counting means, a first window decode means coupled to said counting means, and a second window decode means coupled to said counting means, and said first window decode means providing a change in its output signal before said first counting means counts a subsequent cycle of said subcarrier locked clock signal, and said second window decode means providing a change in its output signal after said first counting means counts a subsequent cycle of said subcarrier locked clock signal, the time between said first and second window decode means providing changes in their output signal comprising a window period around the output of said first counting means.

4. Apparatus according to claim 3, wherein:
   said signal generation means further comprises a flip-flop means having a first input coupled to said count decode means output, a clock input coupled to said subcarrier locked clock signal, a first output comprising said synchronous output signal with a frequency determined by said predetermined fixed frequency relationship, and a second output coupled to a reset input of said first counting means, wherein one subcarrier locked clock signal after said count decode means provides a change at its output, said first output provides said synchronous output signal pulse and said second output causes said first counting means to reset.

5. Apparatus according to claim 4, wherein:
   said received television signal is a television horizontal line signal, said subcarrier locked clock signal is a clock signal at four times the frequency of a subcarrier, said television horizontal line signal has a frequency equal to approximately 1/910 the frequency of said subcarrier locked clock signal, and said count decode means changes its output at a counter count of nine hundred and eight.

6. Apparatus for regenerating a received television to provide an output signal which is synchronous with a subcarrier locked clock signal, comprising:
   a) comparison means for determining whether the received television signal which is to be regenerated and the subcarred locked clock signal have a predetermined fixed frequency relationship, and for generating a first indication when they are related and a second indication when they are not related; and
   b) output signal generation means for dividing down the subcarrier locked clock signal according to said fixed frequency relationship and, when said first indication is generated by said comparison means, for providing said output signal which is synchronized with said subcarrier locked clock signal and at a frequency determined by said predetermined fixed frequency relationship, wherein:
   said comparison means comprises a windowing means for determining whether an edge of said received television signal to be reqenerated occurs outside a preset time window around a time when said edge of said received television signal would occur if said received television signal were related to said subcarrier locked clock signal, and a decision means for deciding whether occurrences of received television clock signal edges outside said preset time window are indicative of said received television signal and said subcarrier locked clock signal being unrelated, and wherein:
   said windowing means provides a signal indicative of said edge, of said received television signal occurring outside said preset time window, and
   said decision means is coupled to said windowing means, and comprises a second counting means for receiving a counting said signals indicative of said edge of said received television signal occurring outside said preset time window, and a second counter count decode means coupled to said second counting means, wherein when said second counting means reaching a count which causes said second counter count decode means to change its output, a determination is made that said received television clock signal and said subcarrier locked signal are unrelated, the output of said second counter count decode means comprising said second indication of said comparison means.

7. Apparatus according to claim 6, wherein:

said decision means further decides whether occurrences of said edges of said received television signals inside said preset tim window are indication of said received television signal and said subcarrier locked clock signal being related, said windowing means further provides a second signal indicative of said edges of said received television signal occurring inside said preset time window, and said decision means further comprises a second second counter count decode means wherein when said second counting means reaching a count which causes said second second counter count decode means to change its output, a determination is made that said received television clock signal and said subcarrier loced signal are related, the output of said second second counter count decode means comprising said first indication of said comparision means.

8. Apparatus for regenerating a received television to provide an output signal which is synchronous with a subcarrier locked clock signal, comprising:
   a) comparison means for determining whether the received television signal which is to be regenerated and the subcarrier locked clock signal have a predetermined fixed frequency relationship, and for generating a first indication when they are related and a second indication when they are not related; and
   b) output signal generation means for dividing down the subcarrier locked clock signal according to said fixed frequency relationship and, when said first indication is generated by said comparison means, for providing said output signal which is synchronized with said subcarrier locked clock signal and at a frequency determined by said predetermined fixed frequency relationship, said apparatus further comprising:
   c) synchronization means for synchronizing said received television signal to said subcarrier locked signal and, when said comparison means generates said second indication, for providing an output signal synchronized with said subcarrier locked clock signal and at a frequency similar to the frequency of said received television signal but at other the said frequency determined by said fixed frequency relationship.

9. Apparatus for regenerating a received television to provide an output signal which is synchronous with a subcarrier locked clock signal, comprising:
   a) comparison means for determining whether the received television signal which is to be regenerated and the subcarrier locked clock signal have a predetermined fixed frequency relationship, and for generating a first indication when they are related and a second indication when they are not related; and
   b) output signal generation means for dividing down the subcarrier locked clock signal according to said fixed frequency relationship and, when said first indication is generated by said comparison means, for providing and said output signal which is synchronized with said subcarrier locked clock signal and at a frequency determined by said predetermined fixed frequency relationship, wherein:
   said received television signal is a television horizontal line signal, and said output signal is a regenerated television horizontal reset signal, said apparatus further comprising:
   c) synchronization means for synchronizing said received television signal to said subcarrier locked singal and, when said comparison means generates said second indication, for providing an output signal synchronized with said subcarrier locked clock signal and at a frequency similar to the frequency of said received television signal but at other than said frequency determined by said fixed frequency relationship.

10. Apparatus according to claim 2, further comprising:
   c) synchronization means for synchronizing said received television signal to said subcarrier locked signal and when, said comparison means generates said second indication, for providing an output signal synchronized with said subcarrier locked clock signal and at a frequency similar to the frequency of said received television signal but at other than said frequency determined by said fixed frequency relationship.

11. Apparatus for regenerating a received television to provide an output singal which is synchronous with a subcarrier locked clock signal, comprising:
   a) comparison means for determining whether the received television signal which is to be regenerated and the subcarrier locked clock signal have a predetermined fixed frequency relationship, and for geneating a first indication when they are related and a second indication when they are not related; and
   b) output signal generation means for dividing down the subcarrier locked clock signal according to said fixed frequency relationship and, when said first indication is geneartted by said comparison means, for providing said output signal which is synchronized with said subcarrier locked clock signal and at a frequency determined by said predetermined fixed frequency relationship, wherein:
   said comparison means comprises a windowing means for determining whether an edge of said received television signal to be regenerated occurs outside a preset time window around a time when said edge of said received television signal would occur if said received television signal were related to said subcarrier locked clock signal, and a decision means for deciding whether occurrences of received television clock signal edges outside said preset time window are indicative of said received television signal and said subcarrier locked clock signal being unrelated, wherein:
   said decision means is further for deciding whether occurrences of said received television signal edges inside said preset time window are indicative of said received television signal and said subcarrier locked clock signal being related, said apparatus further comprising:
   c) sychronization means for synchronizing said received television signal to said subcarrier locked signal, and when said comparison means generates said second indication, for providing an output signal synchronized with said subcarrier locked clock signal and at a frequency similar to the frequency of said received television signal but other than said frequency determined by said fixed frequency relationship.

12. Apparatus according to claim 5, further comprising:
c) synchronization means for synchronizing said received television signal to said subcarrier locked signal and, when said comparison means generates said second indication, for providing an output signal synchronized with said subcarrier locked clock signal and at a frequency similar to the for frequency of said received television signal but at other than said frequency determined by said fixed frequency relationship.

13. Apparatus according to claim 7, further comprising:
c) synchronization means for synchronizing said received television signal to said subcarrier locked signal and, when said comparison means generates said second indication, for providing an output signal synchronized with said subcarrier locked clock signal and at a frequency similar to the frequency of said received television signal but at other than said frequency determined by said fixed frequency relationship.

14. Method for regenerating a received television signal to provide a regenerated output signal which is synchronous with a subcarrier locked clock signal, comprising:
a) determining whether the received television signal which is to be regenerated and the subcarrier locked clock signal have a predetermined fixed frequency relationship;
b) generating a first indication when said received television signal and subcarrier locked clock have said predetermined fixed frequency relationship, and generating a second indication when said received television signal and said subcarrier locked clock do not have said predetermined fixed frequency relationship;
c) dividing down the subcarrier locked clock signal according to said fixed frequency relationship to provide a first output signal which is synchronous with said subcarrier locked clock signal and which has a frequency determined by said fixed frequency relationship;
d) when said first indication is generated, using said first output signal as said regenerated output signal;
e) generating a second output signal which is synchronous with said subcarrier locked clock and having a frequency which is not dictated by said predetermined fixed frequency relationship but which is similar to the frequency of said received television signal; and
f) when said second indication is generated, using said second output signal as said regenerated output signal.

* * * * *